United States Patent [19]
McCabe

[11] Patent Number: 5,132,550
[45] Date of Patent: Jul. 21, 1992

[54] WAVE POWERED PRIME MOVER

[75] Inventor: Richard P. McCabe, Ballymadrough, Ireland

[73] Assignee: Hydam Limited, Dublin, Ireland

[21] Appl. No.: 742,082

[22] Filed: Aug. 1, 1991

Related U.S. Application Data

[63] Continuation of Ser. No. 423,120, Oct. 18, 1989, abandoned.

Foreign Application Priority Data

Oct. 19, 1988 [IE] Ireland ................................. 3159/88

[51] Int. Cl.$^5$ ............................................. F03B 13/12
[52] U.S. Cl. ........................................ 290/53; 290/42; 417/330; 417/331; 417/333
[58] Field of Search ................. 290/42, 53; 417/350, 417/331, 333

[56] References Cited

U.S. PATENT DOCUMENTS

| | | | |
|---|---|---|---|
| Re. 31,111 | 12/1982 | Hagen | 417/331 |
| 4,210,821 | 7/1980 | Cockerell | 290/53 |
| 4,421,461 | 12/1983 | Hicks et al. | 417/331 |
| 4,781,023 | 11/1988 | Gordon | 290/53 |

FOREIGN PATENT DOCUMENTS 2113311  8/1983  United Kingdom .

*Primary Examiner*—A. D. Pellinen
*Assistant Examiner*—Robert Lloyd Hoover
*Attorney, Agent, or Firm*—Edward W. Callan

[57] ABSTRACT

The prime-mover comprises a central inertial barge 1, a first outer wave-engaging pontoon 2 pivotally movable relative to the central barge 1 about the pivotal axis defined by the arrow A, and a second outer wave-engaging pontoon 3 pivotally movable relative to the central barge 1 about the axis defined by the arrow B. Two series of pumps 4 are mounted on the central barge 1 and driven by the pivotal movement of the outer wave-engaging pontoons 2, 3 respectively. A damping mechanism comprising two shafts 6a, 6b extend downwardly from the bage 1. The shafts 6a, 6b are provided with damping plates 7a, 7b at the bottom ends thereof. The damping plates 7a, 7b may be moved relative to the shafts 6a, 6b by being screwed up or down the shafts as required.

8 Claims, 4 Drawing Sheets

WAVE POWERED PRIME MOVER

This is a continuation of co-pending application Ser. No. 07/423,120 filed on Oct. 18, 1989.

The present invention relates to wave powered prime movers.

It has been well known for many years to harness wave energy by means of apparatus comprising two or more rafts or floats connected together so as to be pivotally movable relative to one another. Wave action causes the relative pivotal movement, and the relative movement is converted into useful energy.

Published U.K. Patent Application No. 2113311A, in the name of the inventor of the present invention, discloses a particular arrangement of rafts or floats, namely two rafts connected to one another for relative pivotal movement about a common pivotal shaft, and a damping mechanism for damping the movement of the pivotal shaft so as to maintain the pivotal shaft substantially fixed relative to the mean level of the water. The relative motion of the rafts drives pumps, which drive seawater to an elevated storage tank from which the water may be released to generate electricity.

In prior art wave powered prime movers such as described in U.S. Pat. No. 4,098,084 (Cockerell), the pontoons or buoyant members, will in certain long wave conditions, i.e. when wave length is greater than four times the length of an individual pontoon, become wave followers and thus will not move relative to each other to any great extent.

An object of the invention is to alleviate the above disadvantage.

The present invention provides a wave powered prime mover comprising an inertial body, including an inertial barge and a damping means located beneath the barge at a depth many times greater than that of the barge; at least one wave movable pontoon pivotally connected by a first hinge to the inertial barge; at least one high pressure water pump mounted on the barge and with the or each pontoon pivotally connected to a unique pump or pumps; and a water delivery pipe extending from the inertial barge to shore; whereby in use the inertial body remains substantially stationary over a wide range of wave lengths and the or each pontoon independently powers its own pump or pumps thus ensuring that variation in power can be accommodated to pump water to shore at high pressure.

whereby in use the inertial body remains substantially stationary over a wide range of wave lengths whilst the or each pontoon is moved by passing waves or swell. The use of the inertial barge allows the wave powered prime mover to be energy productive over a wide range of wave conditions. In particular, relative movement between the or each pontoon and the barge still occurs when wave length is greater than four times the length of the pontoon.

Conveniently, the damping means includes at least one damping plate which is movable relative to the inertial barge, whereby the damping plate may be tuned to the site conditions. Additionally, the damping means may be raised relative to the barge to enable the prime mover to be towed.

Advantageously, the damping plate is mounted on a shaft and is screw threadedly movable relative to the shaft.

Preferably, the or each pontoon is provided with adjustable ballast to control the inertial properties of the or each pontoon whereby the prime mover may be tuned to the wave spectra at the site.

Conveniently, the wave powered prime mover includes a delivery pipe through which the water pumped by the prime mover is delivered to an electricity generating turbine or alternatively to a reverse osmosis desalination unit for converting seawater into desalinated water.

The invention further provides, a wave powered prime mover in combination with other such wave powered prime movers in which the inertial bodies of the wave powered prime movers are linked together.

The invention will now be described more particularly with reference to the accompanying drawings which show, by way of example only, one embodiment of wave powered prime mover according to the invention.

Figure 1:
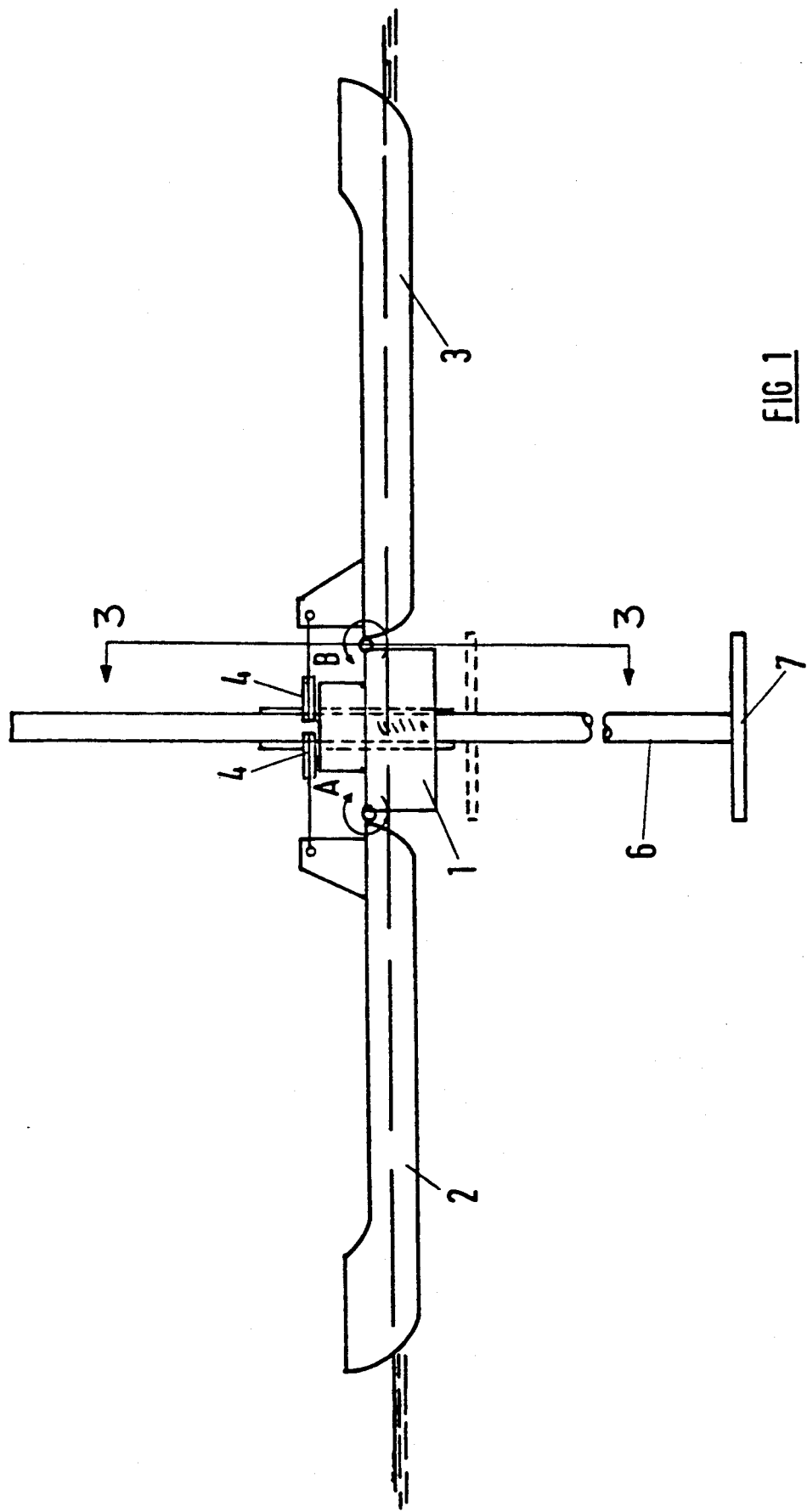
FIG. 1 is a side elevation of the wave powered prime mover.
Figure 2:
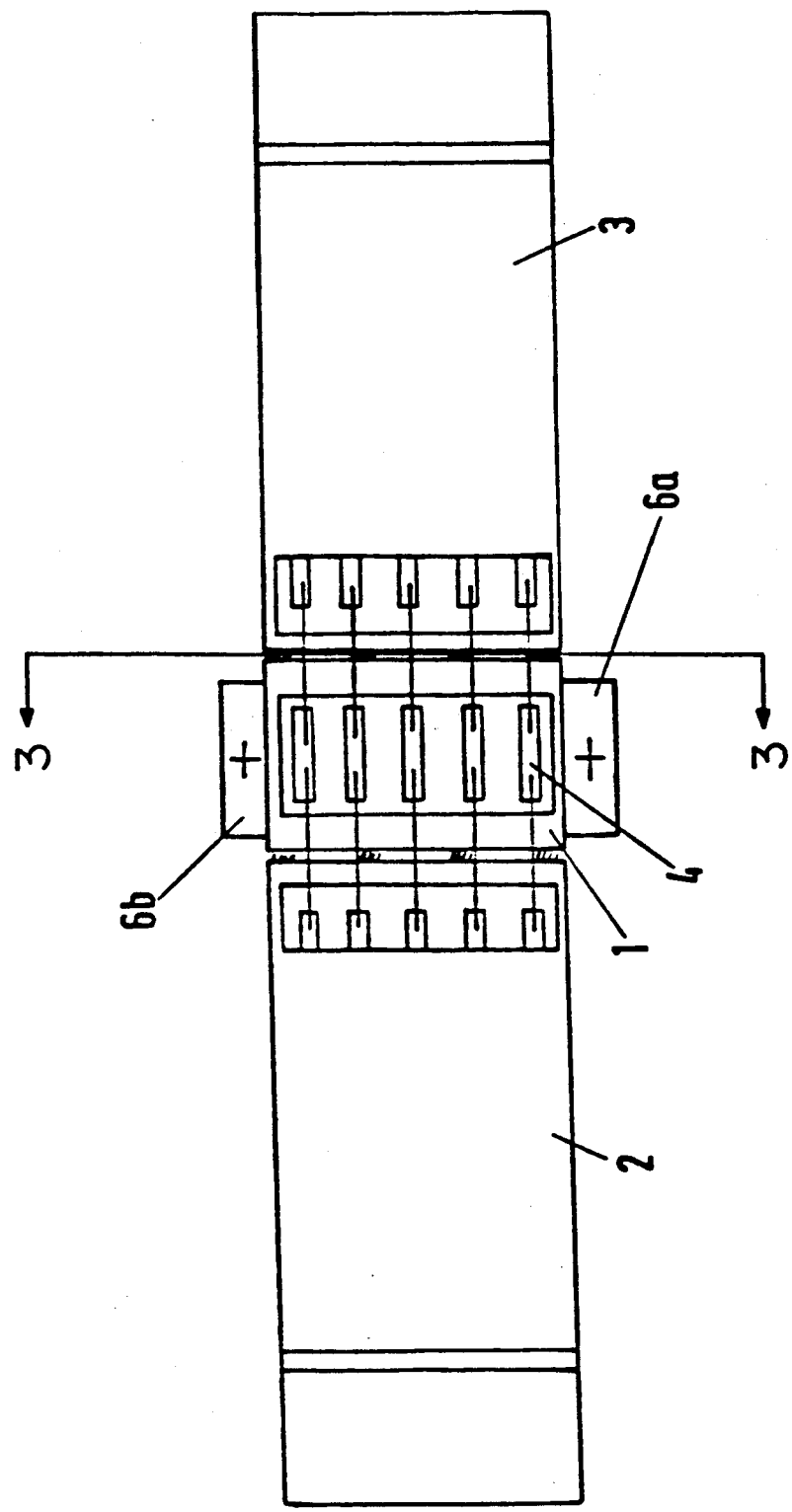
FIG. 2 is a plan view thereof.
Figure 3:
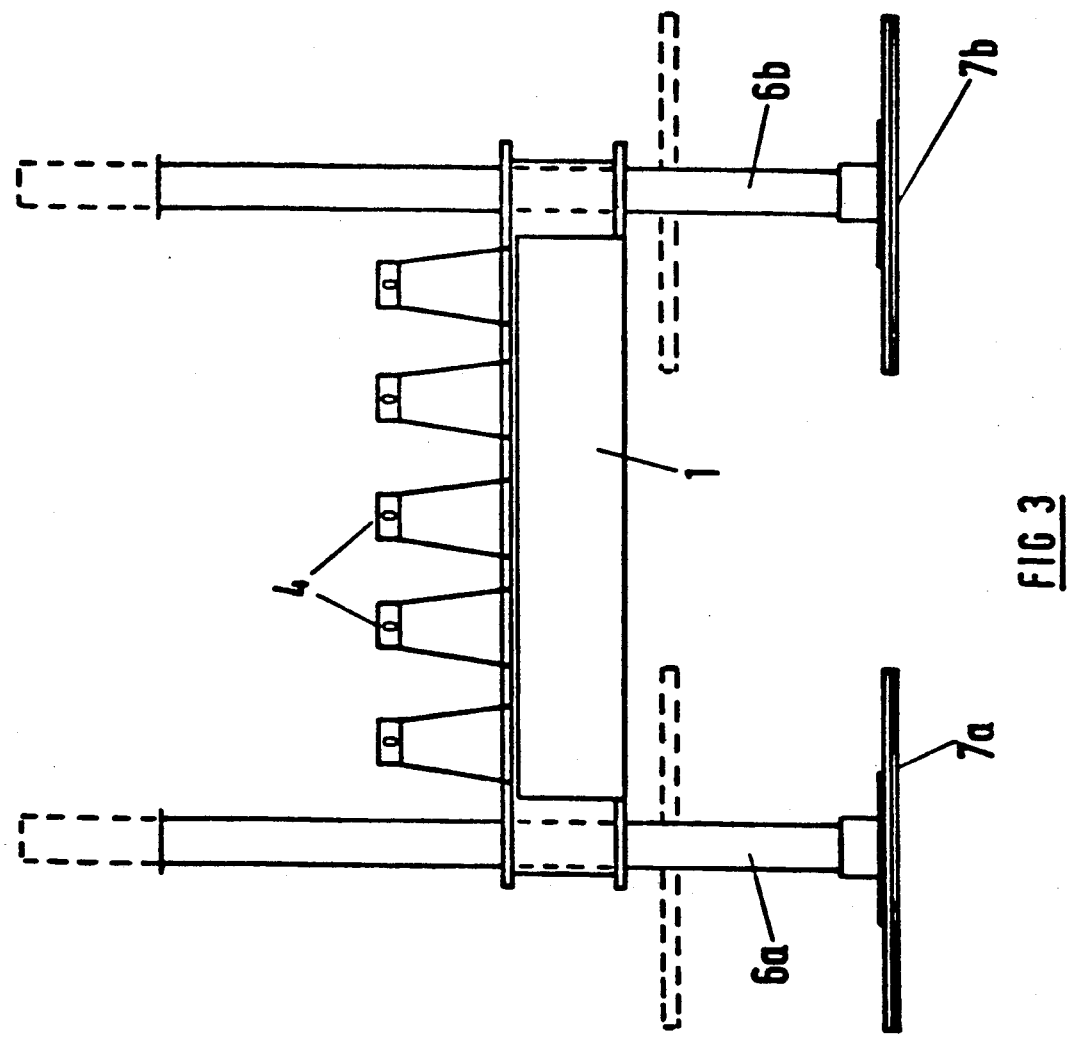
FIG. 3 is a sectional end view thereof taken on line 3—3 of FIGS. 1 and 2.

Referring initially to FIGS. 1, 2 and 3, prime-mover comprises a central inertial barge 1, a first outer wave-engaging pontoon 2 pivotally movable relative to the central barge 1 about the pivotal axis defined by the arrow A, a second outer wave-engaging pontoon 3 pivotally movable relative to the central barge 1 about the axis defined by the arrow B, two series of pumps 4 mounted on the central barge 1 and driven by the pivotal movement of the outer wave-engaging pontoons 2,3 respectively, and a damping mechanism comprising two shafts 6a,6b extending downwardly and provided with damping plates 7a,7b and shafts 6a,6b may be moved up or down relative to barge 1 as required by hydraulic jacks (not shown). Referring to FIG. 1, it is seen that the damping plates 7 are located beneath the barge 1 at a depth many times greater than that of the barge to provide a moment arm that produces a torque sufficient to resist movement of the barge due to random wave motion. Referring to FIG. 1, it is seen that the damping plates 7 are located beneath the barge 1 at a depth many times greater than that of the barge.

Figure 4:
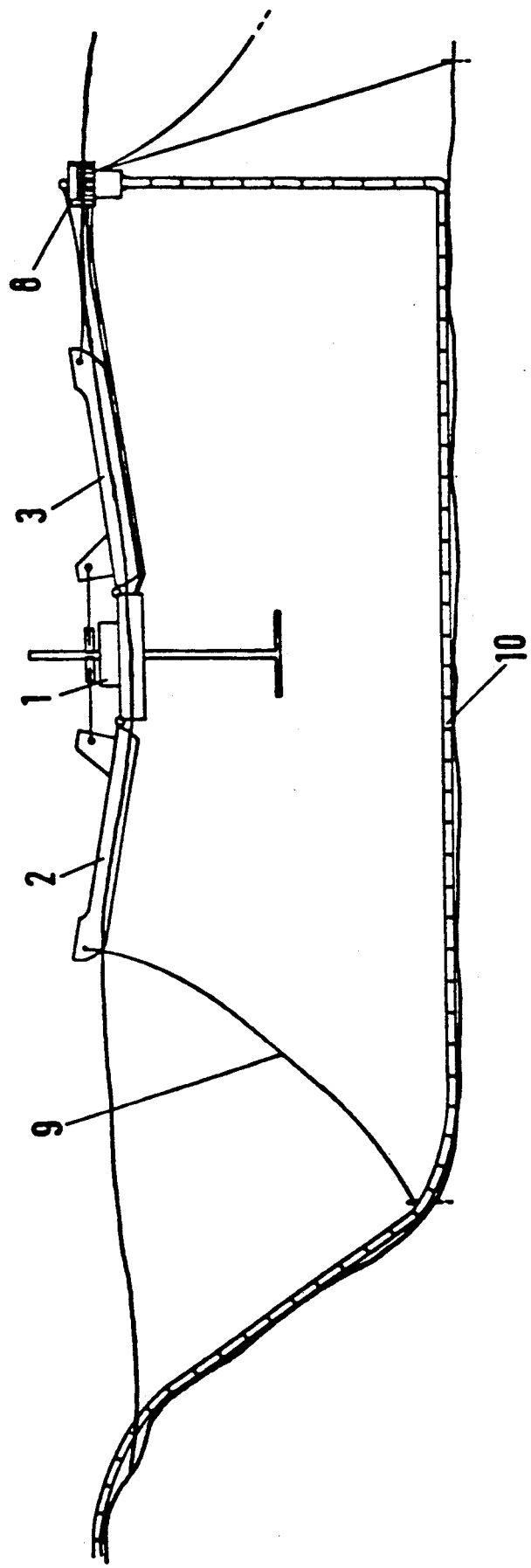
FIG. 4 is a side elevation showing the prime-mover of FIGS. 1, 2 and 3 in use, moored near the shore and pumping seawater ashore.

Referring now to FIG. 4, the mooring arrangement will now be described. The wave powered prime mover is primarily, though not exclusively, intended to harness the energy of the ocean swell, that is the onshore swell coming across the ocean as a result of storms or disturbances at distant locations, and not the power of local wind-generated waves or waves caused by the tide, and in particular is not intended to harness the power of breaking or crested waves. The prime mover is therefore most advantageously moored in relatively sheltered waters behind and island or headland. Because the swell is towards the shore, the prime mover is secured by a mooring buoy 8 located to seaward. The prime mover is prevented from swinging in the wind by secondary mooring lines 9 towards the shore. Further mooring lines (not shown) may also be connected to the damping plates 7a,7b. The wavelength of the ocean swell varies from region to region, and the lengths of the barge 1 and pontoons 2 and 3 are chosen as a function of the characteristic local wavelength to optimize output. A flexible water pipe 10 leads from the prime mover unit to the mooring buoy 8, from there down to the seabed and back to the shore. The pipe 10 is flexible to accommodate the rise and fall of the prime mover and of the mooring buoy 8 as a result of the ebb and flow of the tide. The prime mover pumps seawater to the shore. A relatively high pressure delivery is achieved. The seawater at high pressure is delivered to a reverse osmosis desalination plant which is not shown in the drawings, and desalinated water is produced there.

Alternatively, the high pressure water is delivered to an electricity generated turbine.

In an alternative embodiment not shown in the drawings, the flexible water pipe leads from the prime mover down the damper plate shafts 6a,6b, down to the sea bed and back to the shore.

I claim:

1. A wave powered prime mover comprising:
    an inertial body, including an inertial barge and a damping means located beneath the barge at a depth many times greater than that of the barge;
    at least one or more wave movable pontoon pivotally connected by a first hinge to the inertial barge;
    at least one high pressure water pump mounted on the barge and with the or each pontoon pivotally connected to a unique pump or pumps; and
    a water delivery pipe extending from the inertial barge to shore;
    whereby in use the inertial body remains substantially stationary over a wide range of wave lengths and the or each pontoon independently powers its own pump or pumps thus ensuring that variation in power can be accommodated to pump water to shore at high pressure.

2. A wave powered prime mover as claimed in claim 1, in which a second wave movable pontoon is pivotally connected to the inertial barge by means of a second hinge, with the longitudinal axes of the two pontoons being parallel and with the overall length of the prime mover being a function of wave length.

3. A wave powered prime mover as claimed in claim 2, in which the water delivery pipe extends away from the shore to a mooring buoy, downwards from the mooring buoy to the sea-bed and along the sea bed to the shore.

4. A wave powered prime mover as claimed in claim 3, in which the water pumped by the prime mover is delivered to an electricity generating turbine or alternatively to a reverse osmosis desalination unit for converting seawater into desalinated water.

5. A wave powered prime mover as claimed in claim 1 in which the damping means includes at least one damping plate which is movable relative to the inertial barge, whereby the damping plate may be tuned to the site conditions.

6. A wave powered prime mover as claimed in claim 5, in which the damping plate is mounted on a shaft and is screw threadedly movable relative to the inertial barge.

7. A wave powered prime mover as claimed in claim 1, in which the or each pontoon is provided with adjustable ballast to control the inertial proerties of the or each pontoon whereby the prime mover may be tuned to the wave spectra at the site.

8. A wave powered prime mover comprising:
    an inertial body and a damping means located beneath the body at a depth many times greater than that of the body;
    at least one or more wave movable pontoon pivotally connected by a first hinge to the inertial body;
    at least one high pressure water pump mounted on the body and with the or each pontoon pivotally connected to a unique pump or pumps; and
    a water delivery pipe extending from the inertial body to shore;
    whereby in use the inertial body remains substantially stationary over a wide range of wave lengths and the or each pontoon independently powers its own pump or pumps thus ensuring that variation in power can be accommodated to pump water to shore at high pressure.

* * * * *